United States Patent [19]
Poumey

[11] Patent Number: 5,710,502
[45] Date of Patent: Jan. 20, 1998

[54] SYSTEM FOR RECHARGING THE STORAGE BATTERIES OF AN ELECTRIC MOTOR VEHICLE

[75] Inventor: Michel Poumey, Savigny, France

[73] Assignee: Cableco and Poumey, France

[21] Appl. No.: 660,518

[22] Filed: Jun. 7, 1996

Related U.S. Application Data

[63] Continuation of Ser. No. 252,589, Jun. 1, 1994, abandoned.

[51] Int. Cl.$^6$ ............................................. H02J 7/00
[52] U.S. Cl. ............................................. 320/2
[58] Field of Search ............................ 320/2; 336/232, 336/227

[56] References Cited

U.S. PATENT DOCUMENTS

| | | | |
|---|---|---|---|
| 3,938,018 | 2/1976 | Dahl | 320/2 |
| 4,347,472 | 8/1982 | Lemelson | 320/2 |
| 4,379,988 | 4/1983 | Mattatall | |
| 4,761,628 | 8/1988 | Nishi et al. | 336/232 X |
| 4,800,328 | 1/1989 | Bolger et al. | 320/2 |
| 5,034,717 | 7/1991 | Shinkai | 336/232 X |
| 5,122,729 | 6/1992 | Itoga et al. | |
| 5,157,319 | 10/1992 | Klonz et al. | 320/2 |
| 5,207,304 | 5/1993 | Lechner et al. | 191/10 |
| 5,311,973 | 5/1994 | Tseng et al. | 320/2 X |
| 5,341,083 | 8/1994 | Klontz et al. | 320/2 |
| 5,434,493 | 7/1995 | Woody et al. | 320/2 |

FOREIGN PATENT DOCUMENTS

| | | |
|---|---|---|
| 2434890 | 11/1975 | Germany . |
| 3131105 | 2/1983 | Germany . |
| 0385502 | 5/1990 | Germany . |
| 8404212 | 10/1984 | WIPO . |

Primary Examiner—Peter S. Wong
Assistant Examiner—Patrick Law
Attorney, Agent, or Firm—Wall Marjama & Bilinski

[57] ABSTRACT

A system for recharging storage batteries in an electric motor vehicle includes a stationary unit and a vehicle mounted unit. The stationary unit is provided with a first dielectric case and a high-frequency generator connected to the electric supply mains and to at least one inductor positioned proximate a front wall of the first dielectric case. The vehicle mounted unit includes a second dielectric case positionable adjacent the front wall of the first dielectric case. The second dielectric case is provided with at least one sensor connected to a rectifier which is connected, in turn, to the storage batteries of the vehicle. The at least one sensor is positioned proximate an exterior wall of the second case while both the at least one inductor and sensor are formed from respective flat coils capable of being magnetically coupled through air when positioned adjacent each other.

9 Claims, 5 Drawing Sheets

5,710,502

SYSTEM FOR RECHARGING THE STORAGE BATTERIES OF AN ELECTRIC MOTOR VEHICLE

This is a continuation of application Ser. No. 08/252,589 filed on Jun. 1, 1994 now abandoned.

BACKGROUND OF THE INVENTION

1. Field of the Invention

The invention relates to a system for recharging the storage batteries of an electric motor vehicle.

2. Discussion of the Related Art

Electric motor vehicles operate solely by virtue of the energy stored in electricity-storing batteries. Most of this energy is, of course, used for supplying the electric traction motor. However, another cause of consumption of the stored energy also exists, namely heating, deicing and demisting.

Recharging the storage batteries with electricity generally requires quite a long time, several hours. The power of the charger has to be designed accordingly. Thus, a storage of 12 kW using a 3 kW charger involves charging for a time of at least four hours.

Since the charger is on board the vehicle, its mass, which is approximately 50 kilograms, is thus added to that of the storage batteries. As a result, the presence of the charger puts a further strain on the operating cost.

Moreover, the recharging operation necessitates connecting up to the electric supply mains, thereby posing electrical safety problems, especially in a humid atmosphere.

When it is desired to have much more rapid recharging, it is then necessary to use much more powerful chargers which are therefore much heavier. For example, a 48 kW charger often weighs on the order of 400 kilograms. This mass very rapidly becomes a handicap, without taking into account the fact that connecting this type of charger to the mains poses major safety problems.

In order to overcome difficulties inherent in having a charger on board, it has been proposed, for example in document U.S. Pat. No. 4,347,472, issued Aug. 31, 1982 to J. H. Lemelson, to carry out the charging of the storage batteries of the vehicles by electromagnetic coupling through the air, that is to say in the absence of any magnetic circuit, of the ferrite, soft iron core, or other type.

In this case, the actual charger is constituted by a terminal, integrating a primary winding connected to the electric supply mains and capable of generating a high-frequency electromagnetic field. This field is picked up by a secondary winding, built into the vehicle, and connected to a circuit for charging the storage batteries.

Although making some progress compared to the conventional battery-charging devices, this system is, however, not satisfactory insofar as the constituent windings, respectively of the electromagnetic-field generator and of the sensor detecting this same field, take up a large amount of room and do not allow transfer, by inductive coupling through the air, of large quantities of electricity, especially because of the significant losses in the space separating these two windings. Now, taking into account the requirements relating to the overall size specific to the vehicles, a distance of at least ten centimeters is virtually essential between the two windings, a distance which may easily reach some twenty centimeters.

OBJECTS AND SUMMARY OF THE INVENTION

The object of the present invention is to propose a system for recharging the storage batteries of electric vehicles, satisfying these requirements, and capable of ensuring transfer of electricity, at high power, and for shorter times, while at the same time increasing the safety conditions during the charging periods.

This system for recharging the storage batteries of an electric motor vehicle includes, at a stationary unit, a first dielectric case comprising a high-frequency generator connected, on the one hand, to the electric mains and, on the other hand, to the terminals of at least one inductor arranged in the front wall of the case.

The system also includes, permanently mounted on the vehicle, a second dielectric case comprising, on the face intended to come opposite the front wall of the first case, a sensor which can be magnetically coupled through the air and at some distance from the inductor, connected via its two terminals to a rectifier connected in turn via its two output terminals to the batteries.

The invention is distinguished in that the inductor and the sensor are produced in the form of a flat coil arranged against the walls of the two cases intended to come opposite each other.

In other words, the invention consists in recharging the electric motor vehicle by high-frequency induction, by means of flat coils, thereby eliminating the problems related to the mass of the chargers and to connecting up to the electric mains on the one hand, and enabling significant power to be delivered without generating too substantial losses when coupling through the air.

A system formed by two separate dielectric cases is thus used, the first having a stationary unit forming then the recharging terminal, the second being permanently mounted on the vehicle, so that, when it is desired to recharge the electric vehicle, it suffices to move the second case nearer in order to set it opposite the front wall of the first case comprising the inductor, the distance between the inductor and the sensor being reduced to a minimum. Thus, the high-frequency currents produced by the generator flow through the inductor, causing an electromagnetic field, of the same frequency, radiated by the inductor. The sensor, arranged a few centimeters from the inductor, is then coupled magnetically through the air to the latter and intercepts the electromagnetic field emitted, thereby giving rise to an induced electromotive force between its two terminals. The rectifier placed at the two terminals of the sensor outputs, into the battery, a direct current which is advantageously filtered by a capacitor.

Advantageously, in practice:

a filtering capacitor is placed in parallel between the output terminals of the rectifier;

a charging regulator is inserted in series between the output of the rectifier and the input of the storage batteries;

a capacitor is placed in parallel between the two output terminals of the sensor, so as to form an oscillating circuit of the trap type with the self-inductance of the sensor; this oscillating circuit having a resonant frequency equal to the operating frequency of the generator.

In addition, a Zener diode and an indicator light are arranged in series and then placed in parallel with the filtering capacitor.

The inductor and the sensor are produced in the form of a circular or polygonal, flat coil arranged against the walls of the two cases intended to come opposite each other.

The high-frequency generator is supplied from the electric mains, for example 50 Hz or 60 Hz. The operating frequency is a few tens of kHz, thereby making it possible advantageously to use coils with neither iron nor ferrite for the manufacture of the inductor or the sensor.

Because cells provided according to the invention do not require magnetic cores, the coils can be coupled together essentially entirely through air. The phrase "coupled essentially entirely through air" shall refer to the case wherein neither of a coupled sensor coil and inductor coil includes a magnetic core.

Thus, in the recharging system according to the invention, the vehicle is equipped only with an energy sensor of relatively low, even virtually negligible, mass, this resulting in appreciable operating savings. Moreover, since the first recharging case is completely closed and there is no cable leaving it, the operation is thus carried out under conditions of optimum electrical safety. The voltage of the system is matched to that of the electric battery by virtue of the turns ratio between the number of turns of the inductor coil and that of the sensor coil, it being recalled that it is the number of turns of the sensor coil which has to be matched to the voltage of the electric battery.

Moreover, since the system does not include a removable electrical connection between the vehicle and the terminal, there is no possibility of poor contact.

The power of the generator may be increased in order to ensure very rapid recharging, without increasing the mass to be transported in the vehicle.

Since energy transfer takes place remotely, the vehicle remains DC-isolated from the mains during the recharging operation. The operation is therefore carried out with optimum safety, even in a humid atmosphere.

In practice, it is not always very easy to bring into coincidence the inductor, which is stationary, and the sensor placed on the vehicle. In order to avoid increasing the distance between the sensor and the inductor and thus to decrease the energy picked up, the first case comprises a single high-frequency generator and a plurality of inductors connected in parallel with the output terminals of the high-frequency generator, each inductor then comprising, in series, a relay contact for putting into use when coincident with the sensor. In this way, when the sensor is positioned facing one of the appropriate inductors, the corresponding contact is closed, thereby allowing operation of the generator. At the same time, the control light arranged in series with the Zener diode comes on, indicating that charging is under way. The Zener diode allows the light to come on only if the induced electromotive force is sufficient and greater than the battery voltage. The relay contact may be closed by any appropriate means, especially remotely by action of a permanent magnet located at the center of the sensor coil in the vehicle on a magnetic contact, such as a reed relay positioned at the center of each inductor in the recharging terminal.

If the sensor is not correctly positioned, the indicator light does not come on, which forces the driver of the vehicle to move the vehicle until this indicator light comes on. The second case may be arranged on the vehicle at any appropriate point.

In an advantageous embodiment, and for the same reasons, this second case comprises a plurality of sensors each associated with a rectifier, the terminals of the same kind (or more or less so) of the rectifiers then being connected respectively together, and then to the single filtering capacitor.

In another embodiment, the second case is fitted into the vehicle and is connected via a flexible cable to the input terminals of the rectifier. When it is desired to recharge, it suffices to bring this second case out in order to release it from its housing and apply it to the recharging terminal forming the first, stationary-unit case, the two cases being held fast by any known rapid-attachment means, such as magnets, quarter-turn fasteners, or the like.

BRIEF DESCRIPTION OF THE DRAWING

The manner in which the invention may be realized and the advantages which stem therefrom will become clearer from the exemplary embodiments which follow, supported by the appended drawing, wherein.

DETAILED DESCRIPTION OF THE PREFERRED EMBODIMENTS

Figure 1:
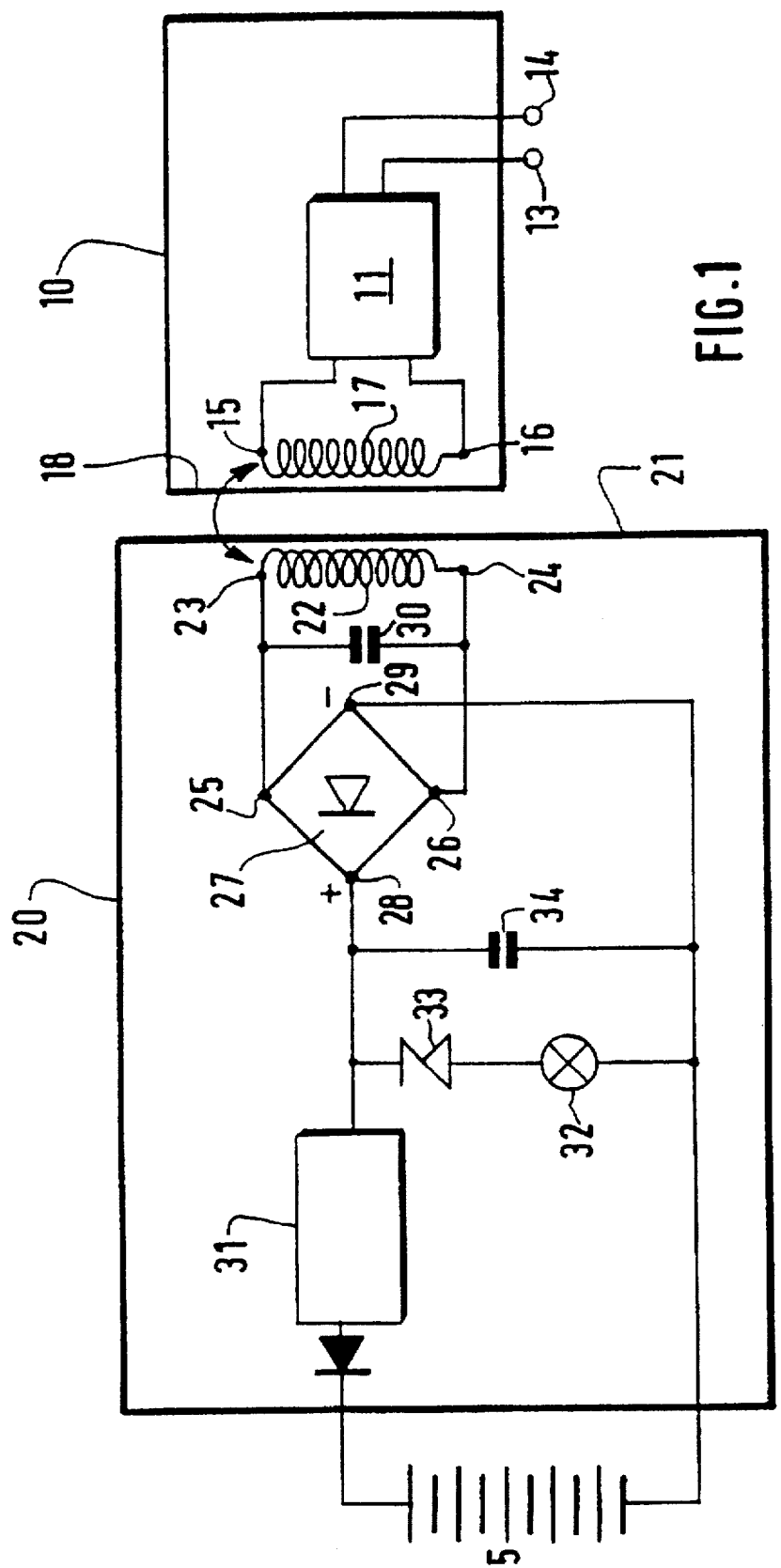
FIG. 1 represents the electric circuit diagram of the inductive recharging system according to the invention.
Figure 2:
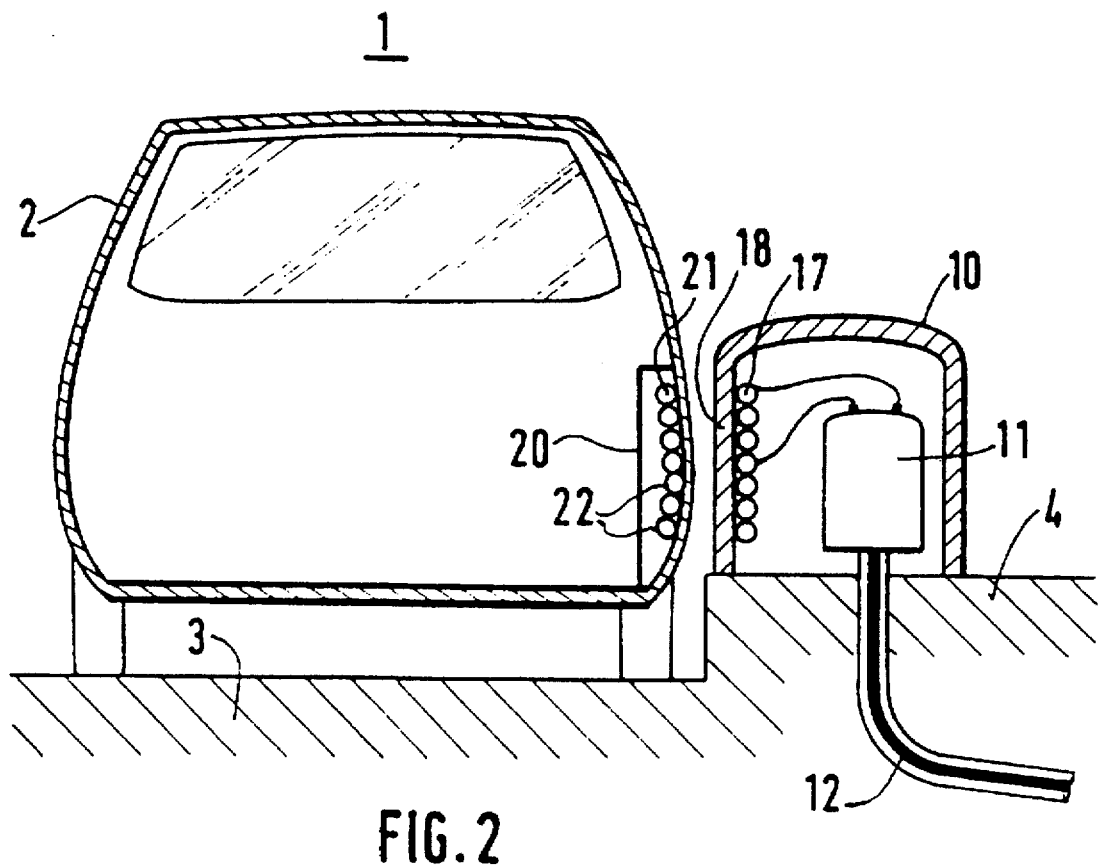
FIG. 2 is a summary diagrammatic representation of this system installed on an electric motor vehicle.

In the figures, the reference (1) designates the electric vehicle, the body, or more precisely part of the body (2), of which is made of plastic. The reference (3) designates the road and the reference (4) a sidewalk. The reference (5) designates the storage batteries enabling the electric vehicle (1) to be operated.

According to the invention, the recharging system essentially comprises two closed dielectric cases, respectively (10, 20), made of plastic for example, the first case, called recharging case, being intended to be placed at a stationary unit, for example on the sidewalk (4). According to the invention, this first case comprises a high-frequency generator (11) supplied, by a cable (12) to the terminals (13, 14) at the mains, at 50 Hz or 60 Hz for example. The generator (11) is of a standard type, for example similar to those used in induction heating. This generator is connected to the terminals (15, 16) of an inductor (17) arranged in the immediate vicinity of the front wall (18) of the case (10). This inductor (17) is formed by a flat spiral similar to that used in inductively heated cooking plates. The spiraled winding may be either circular or polygonal.

According to another characteristic of the invention, the motor vehicle (1) comprises, permanently mounted on the vehicle (1), a second closed dielectric case (20), the interior of whose external face (21) intended to come opposite the front wall (18) of the first case (10) comprises a sensor (22), the coil of which is similar to (17). These two coils, respectively the inductor coil (17) and the sensor coil (22), are separated by as short a distance as possible, for example on the order of only a few centimeters (up to twenty centimeters). The sensor (22) is therefore coupled magnetically through the air to the inductor (17), which intercepts the electromagnetic field emitted by this inductor (17), thereby giving rise to an electromotive force. The sensor (22) is connected via its two terminals (23, 24) to the two respective input terminals (25, 26) of a rectifier (27). The output terminals (28, 29) of this rectifier (27) are connected to the storage batteries (5) to be recharged. A tuning capacitor (30) is placed in parallel between the terminals (23, 24) of the sensor and the input terminals (25, 26) of the rectifier (27). This capacitor (30) is sized so as to obtain resonance for the operating frequency of the generator (11). This capacitor (30) constitutes, with the self-inductance of the sensor (22), an oscillating circuit of the "trap" type. A charging regulator (31) is placed in series between the output (28) of the rectifier (27) and the input of the storage batteries (5).

An indicator light (32), usefully placed on the dashboard, in series with a Zener diode (33), is placed in parallel between the output (28) of the rectifier and the input of the regulator (31). A filtering capacitor (34) is mounted in parallel with the output terminals (28, 29) of the rectifier (27).

The electromotive force induced in the sensor (22) and rectified by the rectifier (27) delivers to the filtering capacitor (34) a DC voltage greater than that of the battery. A charging current therefore flows from the terminals of the capacitor (34) to those of the battery (5) and flows through the charging regulator. The function of the latter is to progressively decrease, in a conventional way, the charging current as the value of the battery voltage increases and even to bring it to zero when the battery is completely recharged.

Figure 3:
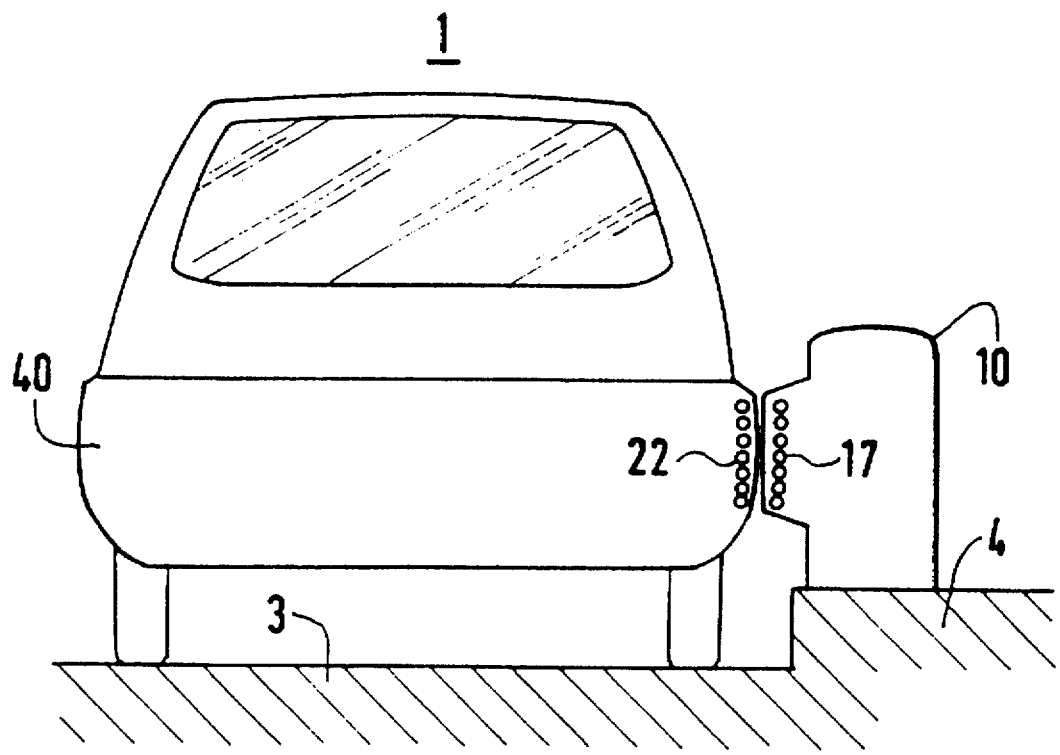
FIGS. 3 to 6 show other embodiments of the invention on an electric motor vehicle.

In another embodiment shown in FIG. 3, the second case, for example made of a deformable and insulating flexible material, in which the sensor (22) is embedded, is permanently mounted on the vehicle and arranged on the side wall (40) of the vehicle (1). It thus suffices, taking advantage of the deformation of the side wall (40), to place the sensor (22) and the inductor (17) opposite and in as close as possible a contact with each other.

Figure 5:
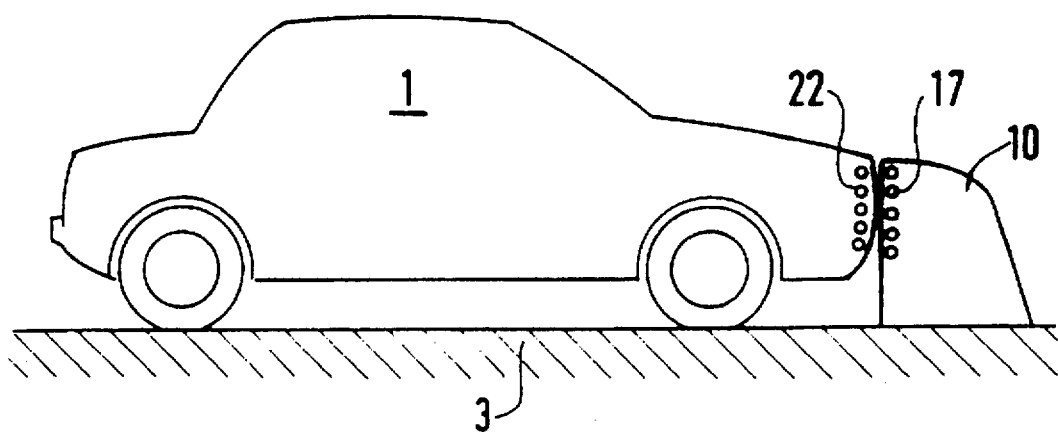

In another embodiment shown in FIG. 5, the sensor (22) may be mounted at the front and therefore allows charging when parked at an angle. It then suffices for the vehicles to come into virtual abutment with the first case (10) placed for this purpose.

Figure 4:
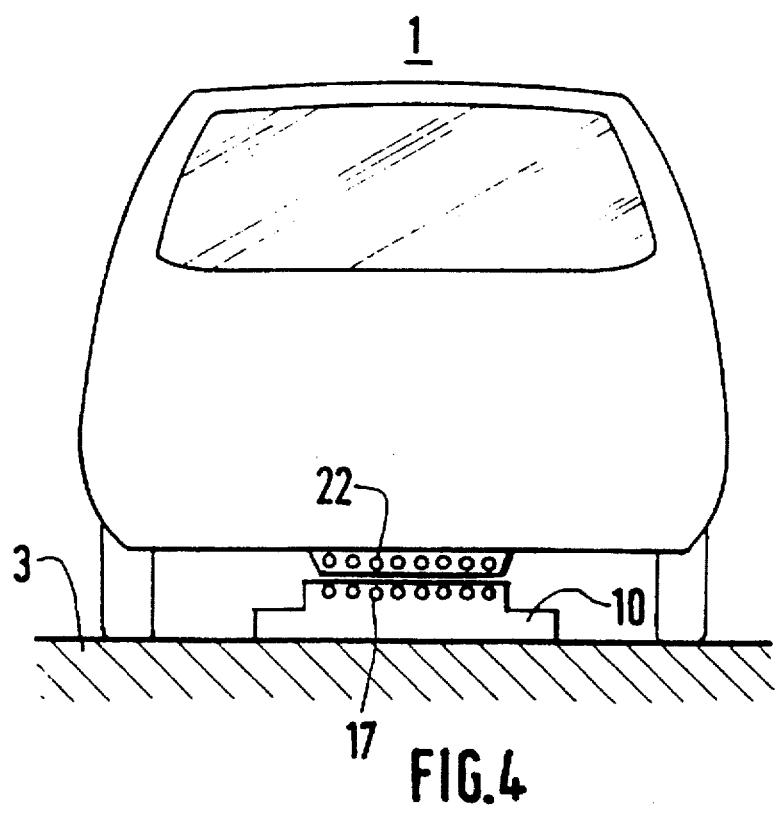

In an embodiment shown in FIG. 4, the recharging takes place from beneath the vehicle using a telescopic or non-telescopic block.

Figure 6:
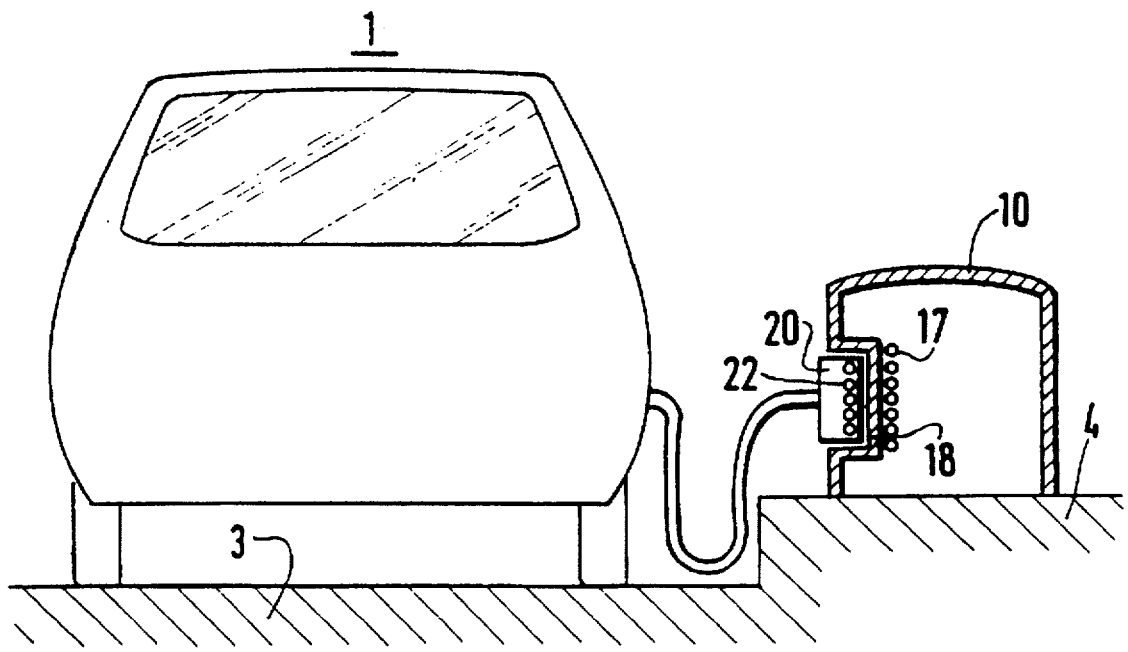

In another embodiment shown in FIG. 6, the recharging case (10) has an inset, in the vicinity of the wall (18) of which inset is placed the characteristic inductor (17).

In another embodiment, the case (20) which includes the sensor (22) is connected via a twin-conductor flexible cable (41) to the vehicle (1). The case (20) and lead (41) assembly is placed in a housing provided for this purpose in the vehicle (1). The lead (41) is connected to the rectifier (27) by any known means. When the battery is to be recharged, it suffices to extract the case (20) from the vehicle, so as to fit it into the housing provided for this purpose in the recharging case (10) and to attach it by any appropriate means, such as built-in magnets, rapid attachment of the quarter-turn type, or other means. When charging is finished, the case (20) is positioned back in the vehicle (1) and the flexible linkage cable (41) goes back into the housing provided for this purpose, the plug of which is the actual case (20). This solution reduces both the cost of the recharging case (10) and the cost of the sensor (22).

Figure 8:
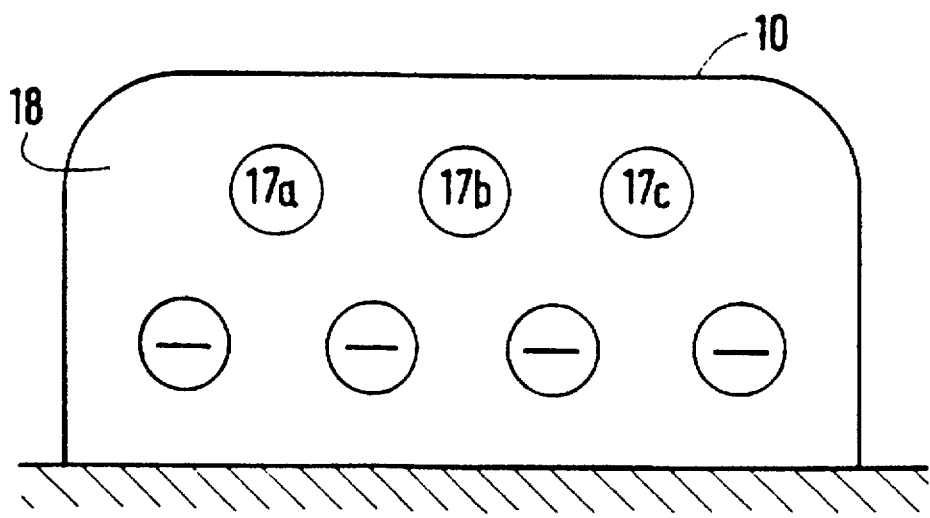
FIGS. 7 and 8 show an improved embodiment using a plurality of inductors in the recharging terminal.
Figure 7:
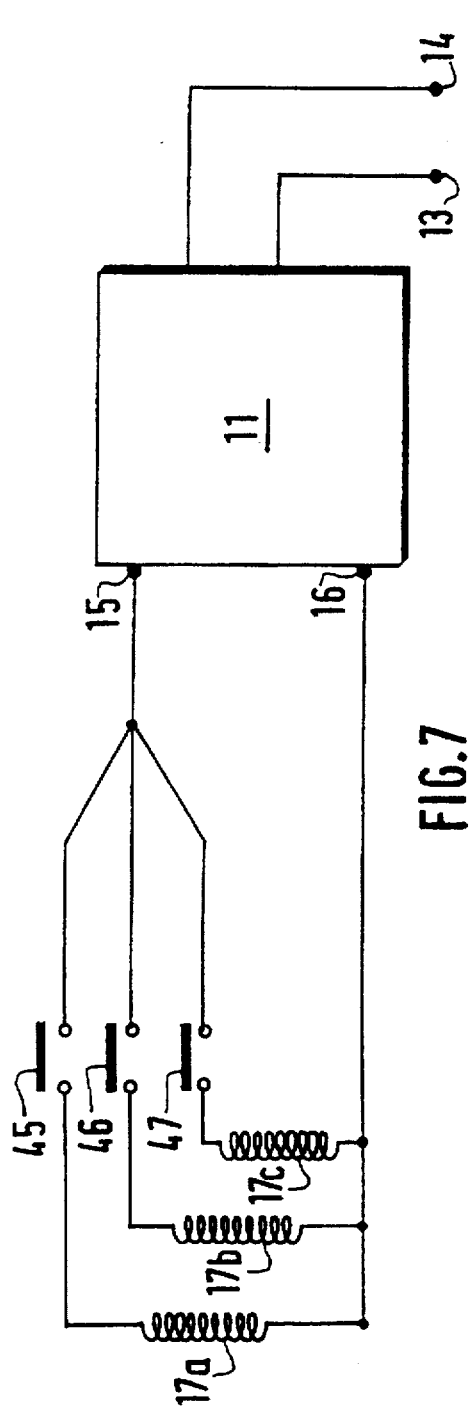

In a practical embodiment shown in FIGS. 7 and 8, the recharging case (10) comprises a single generator (11) and a plurality of inductors, respectively (17a, 17b, 17c), in parallel with the output terminals (15, 16) of the generator (11). The inductors (17a, 17b, 17c) are distributed over the face (18) of the recharging case (10). Each inductor includes in series a respective contact (45, 46, 47) which enables it to be put into use. When the sensor (22) of the vehicle (1) is positioned facing one of the inductors (17a, 17b, 17c), the corresponding contact (45, 46, 47) is closed, thereby engaging the generator (11). At the same time, on the vehicle dashboard, the indicator light (32) comes on, thereby indicating that charging is under way. The Zener diode (33) allows the indicator light (32) to come on only if the electromotive force induced is sufficient and greater than the voltage of the battery (5). The corresponding relay contacts (45, 46, 47) may be closed by the remote action of a permanent magnet located at the center of the coil of the sensor (22) in the vehicle (1) on a magnetic contact, such as a reed relay placed at the center of each inductor (17a, 17b, 17c) in the recharging case (10). Thus, as long as the position of the sensor (22) is not satisfactory, the indicator light (32) does not come on, thereby forcing the driver of the vehicle (1) to move his vehicle until this indicator light (32) comes on.

Figure 9:
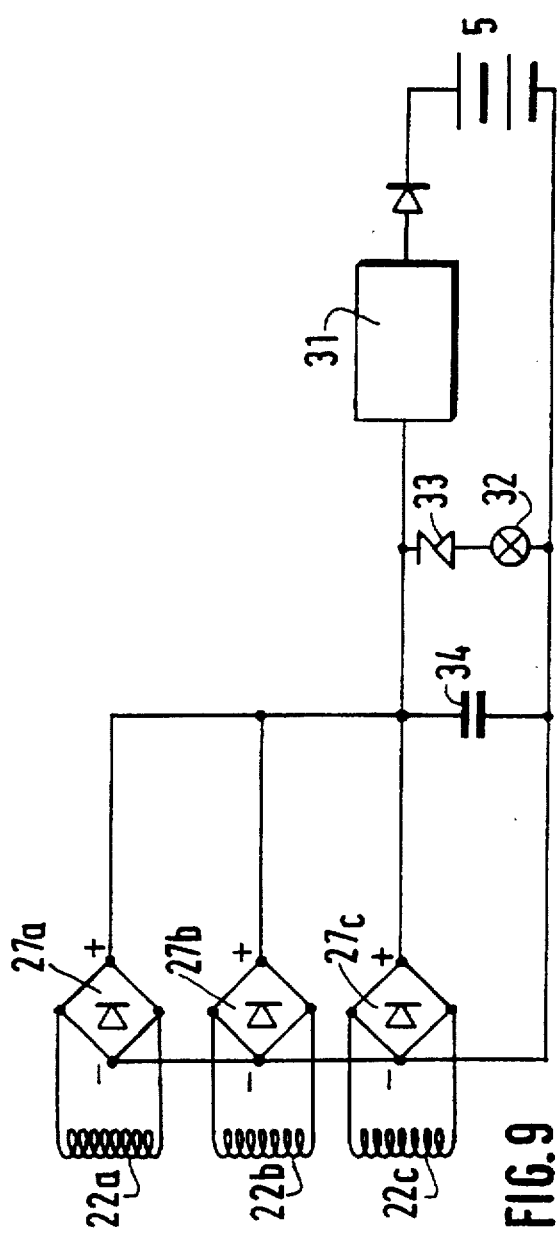
FIG. 9 shows the electric circuit diagram of an embodiment formed by a plurality of sensors for the recharging of the same electric battery.

In another embodiment shown in FIG. 9, the second case (20) includes a plurality of sensors (22a, 22b, 22c) placed, for example, on the side walls, at the front or beneath the underside of the vehicle. Each sensor (22a, 22b, 22c) is associated, as in FIG. 1, with a corresponding rectifier (27a, 27b, 27c), all the terminals of the same kind being connected to the terminals of the single filtering capacitor (34). When one of the sensors is in coincidence with the inductor, a DC voltage appears at the terminals of the single filtering capacitor (34). The rectifiers of the other sensors, not in coincidence with the inductor, prevent the direct current, coming from said DC voltage produced, from flowing into said sensors.

This recharging system in accordance with the invention has many advantages compared to the solutions commercialized hitherto. Among these may be mentioned:

the considerable reduction in the weight of the vehicle, especially in the case of rapid charging, since the vehicle is equipped only with the energy sensor (20), the mass of which is very low;

good safety when recharging, since the recharging case (10) is closed and has no cable leaving it;

the absence of disconnectable electrical connections to be made between the recharging case (10) and the second case (20) of the vehicle (1), which is a completely reliable way of transferring energy from the case to the vehicle;

the possibility of increasing the power of the generator (11) in order to ensure very rapid recharging;

the fact that, throughout the operation, the vehicle (1) remains DC-isolated from the mains (13, 14), thereby decreasing the electrical dangers, especially in a humid atmosphere.

Whiled this invention has been described in detail with reference to certain preferred embodiments, it should be appreciated that the present invention is not limited to those precise embodiments. Rather, in view of the present disclosure which describes the best mode for practicing the invention, many modifications and variations would present themselves to those of skill in the art without departing from the scope and spirit of this invention, as defined in the following claims.

What is claimed is:

1. A system for recharging storage batteries of an electric motor vehicle, comprising:

an electrical supply means;

at a stationary unit, a first dielectric case having an inductor disposed therein, said inductor having a terminal arranged in a front wall of said case, said case comprising a high-frequency generator connected, on the one hand, to said electric supply mains and, on the other hand, to said terminals of said inductor;

permanently mounted on the vehicle, a second dielectric case comprising, on a face intended to come opposite the front wall of the first case, a sensor which can be magnetically coupled through the air and at some distance from the inductor, connected via its two terminals to a rectifier, itself connected via its two output terminals to the batteries, wherein the inductor and the sensor are produced in the form of a flat coil arranged against the wall of the two cases intended to come opposite each other.

2. A system for recharging storage batteries in an electric motor vehicle, comprising:

a stationary unit including a first dielectric case and a high frequency generator connected on an input side to an electric supply mains and on an output side to at least one inductor positioned proximate a front wall of said first dielectric case; and a second dielectric case being permanently mounted on the vehicle and positionable adjacent said front wall of said first dielectric case, said second dielectric case including at least one sensor connected to a rectifier being connected, in turn, to the storage batteries of the vehicle, said at least one sensor positioned proximate an exterior wall of the second case, said at least one inductor and sensor including respective closed approximately flat coils adapted to become magnetically coupled essentially entirely through air when positioned in proximity to each other without use of magnetic cores in said at least one inductor and sensor.

3. The system of claim 2, wherein said stationary unit includes an inset part and wherein said rectifier and storage batteries are housed within the vehicle, and said second dielectric case is detachable from the vehicle by means of flexible cable so that the second case is positionable within said inset port for recharging the storage batteries of the vehicle.

4. A system for recharging storage batteries in an electric motor vehicle, comprising:

a stationary unit including a first dielectric case and a high-frequency generator connected on an input side to an electric supply mains and on an output side to a plurality of inductors each connected in parallel to output terminals of said high-frequency generator, said inductors positioned proximate a front wall of said first dielectric case;

a second dielectric case being permanently mounted on the vehicle and positionable adjacent said front wall of said first dielectric case said second dielectric case including at least one sensor connected to a rectifier being connected, in turn, to the storage batteries of the vehicle, said at least one sensor positioned proximate an exterior wall of the second case, said inductors and said sensor formed from respective flat coils capable of being magnetically coupled through air when positioned adjacent each other;

each inductor further connected in series with a corresponding relay contact for activation of a respective inductor when positioned adjacent said at least one sensor.

5. A system for recharging storage batteries in an electric motor vehicle, comprising:

a stationary unit including a first dielectric case and a high-frequency generator connected on an input side to an electric supply mains and on an output side to at least one inductor positioned proximate a front wall of said first dielectric case;

a second dielectric case being permanently mounted on the vehicle and positionable adjacent said front wall of said first dielectric case, said second dielectric case including a plurality of sensors positioned proximate said exterior wall of said second dielectric case, each sensor connected in parallel to input terminals of a respective rectifier, output terminals of said respective rectifiers of like polarity connected in parallel with a filtering capacitor connected, in turn, in parallel with the storage batteries, said at least one inductor and said sensors formed from respective flat coils capable of being magnetically coupled through air when positioned adjacent each other.

6. The system for recharging storage batteries according to claim 4 further including a tuning capacitor connected in parallel with said at least one sensor to form a trap type oscillating circuit with self-inductance of the sensor, the resonance frequency of said oscillating circuit being equal to the operating frequency of said high-frequency generator.

7. The system for recharging storage batteries according to claim 4 further including a charging regulator connected in series between a first output terminal of said rectifier and the storage batteries.

8. The system for recharging storage batteries according to claim 7 further including a filtering capacitor connected in parallel between said first output terminals of said rectifier and a second output terminal thereof.

9. The system for recharging storage batteries according to claim 8 further including a Zener diode connected in series with an indicator light, said Zener diode and said indicator light, in turn, connected in parallel between said filtering capacitor and said charging regulator so that an output terminal of the diode is connected to an input terminal of said charging regulator.

* * * * *